J. STAKUTIS.
BIRD CAGE.
APPLICATION FILED JAN. 16, 1922.

1,420,880.

Patented June 27, 1922.
3 SHEETS—SHEET 3.

Inventor
John Stakutis.

By

Attorneys

UNITED STATES PATENT OFFICE.

JOHN STAKUTIS, OF CHICAGO, ILLINOIS.

BIRD CAGE.

1,420,880.   Specification of Letters Patent.   Patented June 27, 1922.

Application filed January 16, 1922. Serial No. 529,786.

*To all whom it may concern:*

Be it known that I, JOHN STAKUTIS, a citizen of the United States, residing at Chicago, in the county of Cook and State of Illinois, have invented new and useful Improvements in Bird Cages, of which the following is a specification.

This invention relates to cages for confining birds, and its object is to provide a bird cage having the general shape or outline of an aeroplane, together with certain novel and improved features of construction to be described hereinafter in detail.

In order that the invention may be better understood, reference is had to the accompanying drawings forming a part of this specification, and in said drawings—

Figure 1:
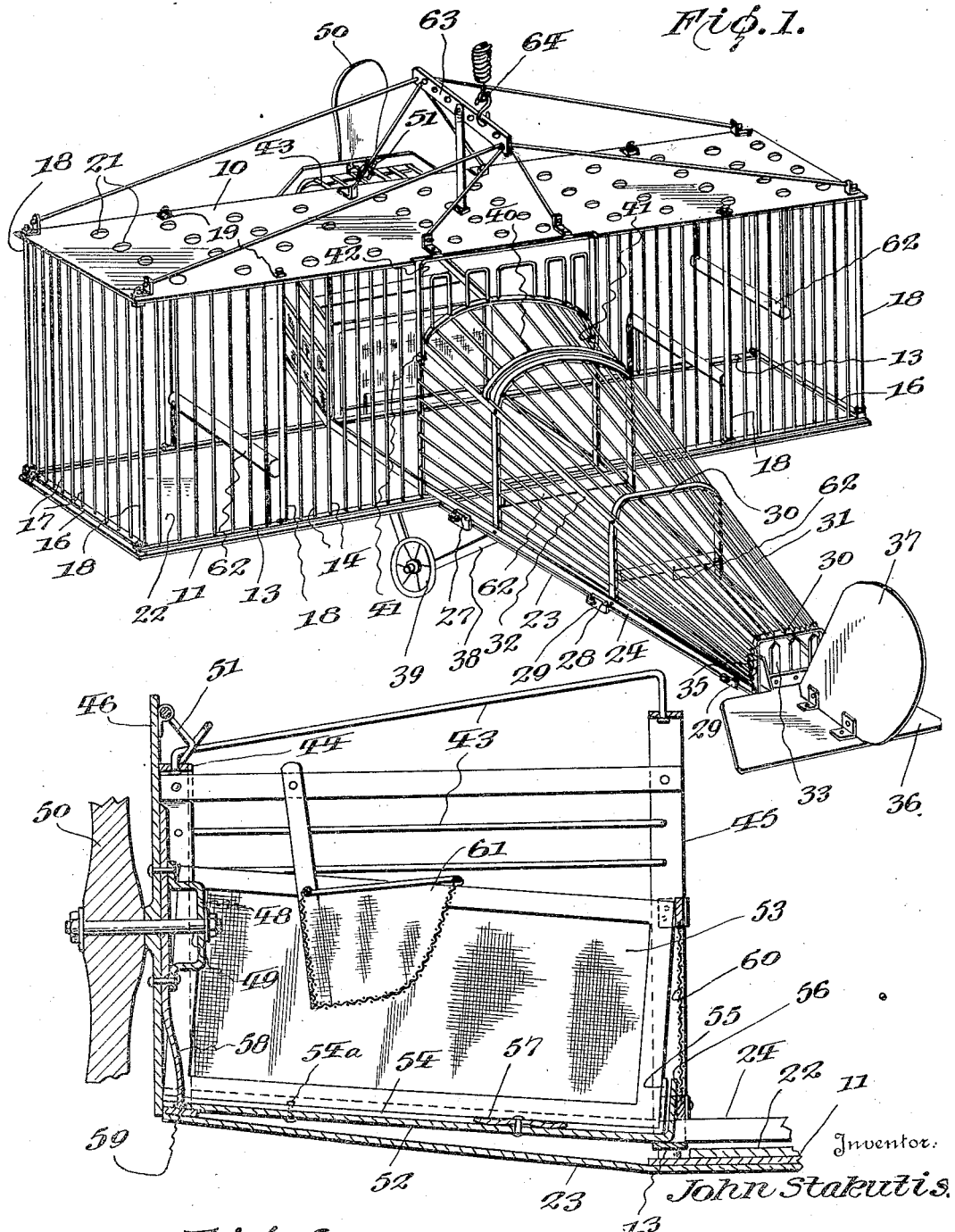
Figure 2:
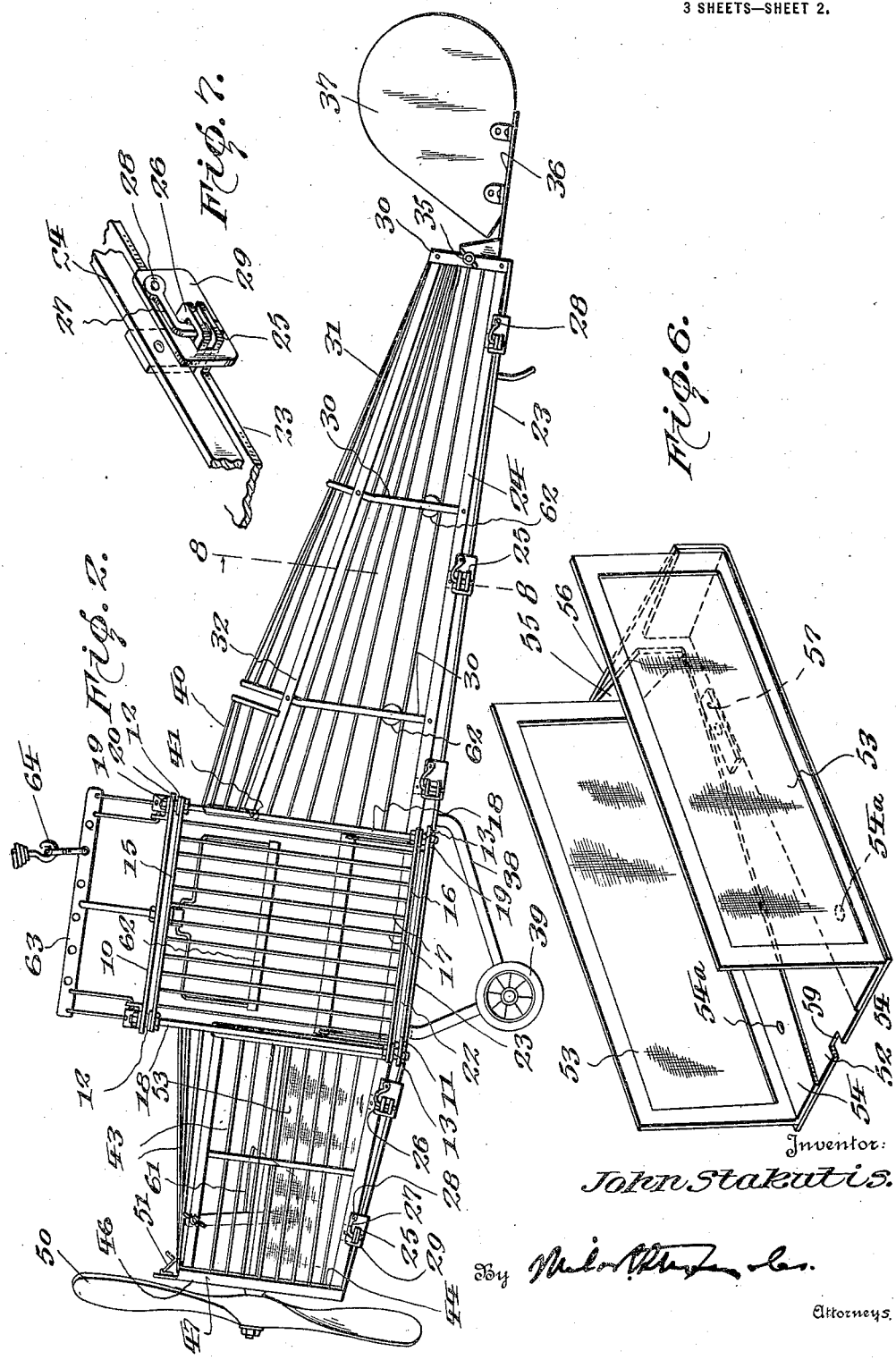
Figure 3:
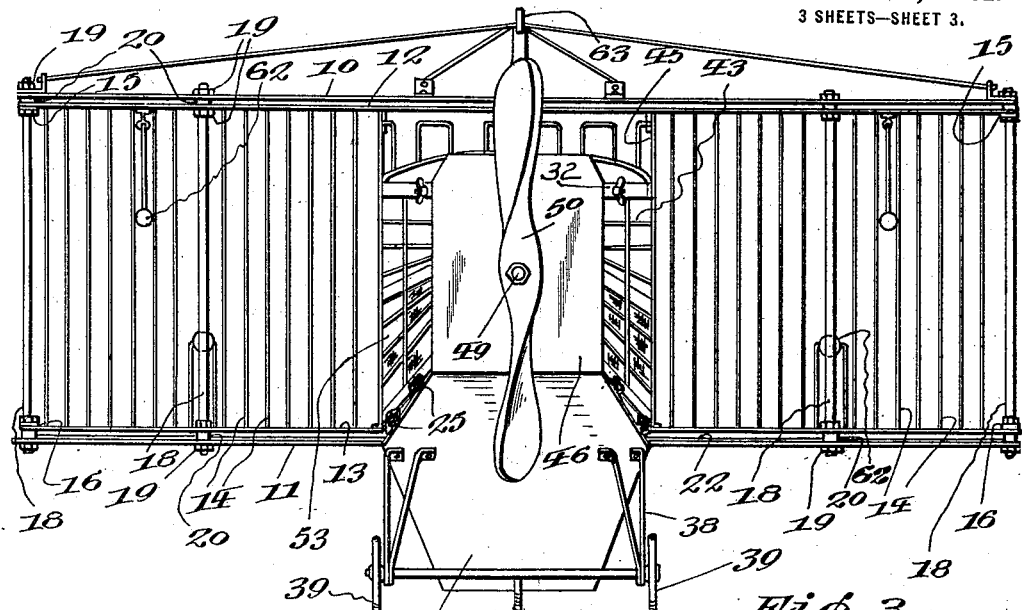
Figure 4:
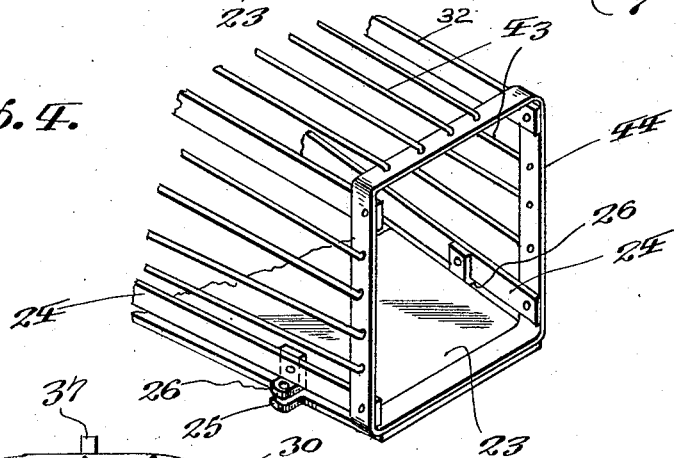
Figure 8:
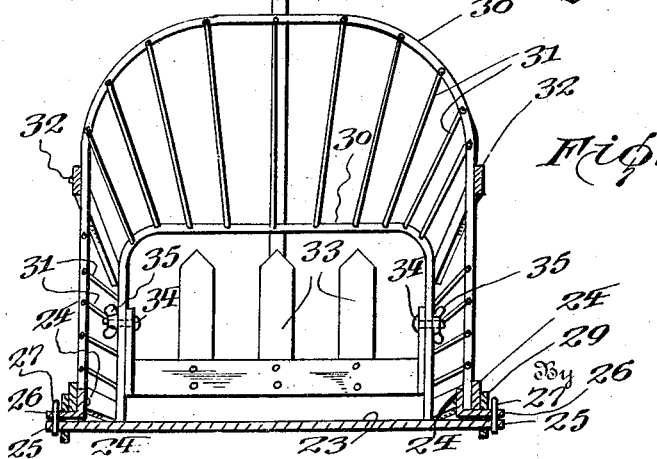

Figure 1 is a perspective view of the cage; Fig. 2 is a side elevation thereof; Fig. 3 is a front elevation; Fig. 4 is a perspective view of a fragment of the forward end of the cage; Fig. 5 is a central longitudinal section of a feeding chamber; Fig. 6 is a perspective view of a tray adapted to be positioned in the feeding chamber; Fig. 7 is a perspective view of a latch device, and Fig. 8 is a cross-section on the line 8—8 of Fig. 2.

Referring specifically to the drawings, the cage is a barred or reticulated structure having the general outline or shape of an aeroplane of the biplane type. This arrangement produces an elongated cage section simulating the body of the machine and a transverse section simulating the wings of the machine. The two cage sections are in communication, and the forward portion of the longitudinal section, ahead of the transverse section, is a feeding chamber.

The transverse section of the cage is composed of top and bottom sheet metal plates 10 and 11, and barred end, front and rear walls extending vertically therebetween, the front and rear walls having openings so as to place the interior of this cage section in communication with the interior of the longitudinal section. The barred end, front and rear walls are composed of panels, the front and rear panels being made up of top and bottom strips 12 and 13 connected by vertically extending and laterally spaced rods or wires 14. Similarly arranged top and bottom strips 15 and 16, and rods 17, form the end panels. On the ends, and intermediate the ends, the front and rear panels are also provided with spacer rods 18 extending vertically between the strips 12 and 13. The rods 18 also pass through the top and bottom plates 10 and 11 and are secured by nuts 19, with washers 20 on the rods between the plates and the top and bottom strips of the panels. The top plate 10 has perforations 21, and on the bottom plate 11 is removably positioned a celluloid sheet 22, the same being insertible from either end. This sheet is removable so that it may be readily cleaned, and it serves as a cover for the bottom plate to keep the same clean.

The longitudinal cage section has a bottom consisting of a sheet metal plate 23 extending throughout its entire length and positioned beneath the plate 11 where it crosses the same. At the longitudinal edges of the plate 23 are strips 24 to which said plate is fastened, the fasteners shown in Fig. 7 being employed. As shown, the plate has an outstanding ear 25 and the strip carries a similar ear 26. These ears are apertured, the apertures being alined to receive the bill of a hook 27 pivoted at 28 to a plate 29 having an aperture so that it may be slipped over the ears, after which the hook bill is inserted into the apertures of the ears, the plate 29 now being behind the hook. This device provides a simple and efficient fastener for permitting detachment of the plate 23 from the strip 24.

The strips 24, to the rear of the transverse section of the cage, are connected by arched bars 30 carrying the spaced longitudinal wires or rods 31 which form the sides and the top of the rear portion of the longitudinal cage section, and these walls are also provided near the top, with longitudinal brace bars 32. The rear end of the longitudinal chamber is closed by a gate 33 fastened to the rear arched bar 30 by bolts 34 provided with wing nuts 35. This end of the chamber is also fitted with aeroplane rudders 36 and 37, and the bottom plate 23 carries the supporting frame 38 of a pair of wheels 39.

Immediately to the rear of the transverse cage section, the longitudinal cage section has at the top a door 40 through which the bird may be introduced into the cage, said door being hinged, as shown at 41, to a frame 42 set in the rear opening which establishes communication between the transverse cage section and the rear portion of the longitudinal section.

The forward portion of the longitudinal cage section, or that portion which is ahead of the transverse section is arranged to serve as a feeding chamber, and it has for its bottom the forward end of the plate 23. This chamber is rectangular, with a forward taper, and its sides and top are also barred, being composed of spaced wires or rods 43 extending lengthwise between a front rectangular frame 44 and a rear rectangular frame 45 which seats in an opening in the front wall of the transverse cage section, said opening establishing communication between the transverse section and the feeding chamber. The front end of the feeding chamber is closed by a plate 46 having lateral flanges 47 at its ends, said flanges lapping the vertical end portions of the frame 44. The plate 46 carries a bearing bracket 48 which supports the shaft 49 of a propeller 50. The top of the plate 46 carries a pivoted latch 51 for holding said plate in place.

The feeding chamber houses a tray which serves as a lining to prevent the escape or scattering of feed, sand, feathers, etc., from the chamber. This tray is composed of a sheet metal bottom plate 52, and side walls consisting of screened panels 53 having inturned bottom flanges 54 seating on and pivoted adjacent to one end thereof, as shown at 54ª. The rear ends of the flanges are upturned, as shown at 55, and the corresponding end of the bottom plate 52 has an upstanding flange 56. The sides of the tray are hinged to the bottom 52 in the manner stated to permit insertion and removal of the tray from the feeding chamber, the latter, as stated hereinbefore, having a forward taper. To insert the tray the sides thereof are swung together so that the spread at the rear end permits insertion of the tray from the front end of the chamber, the plate 46 of course being first removed. After the tray has been inserted, its sides may be spread to diverge rearwardly to lie closely against the forwardly converging sides of the chamber. A cleat 57 on the plate 52 may now be swung to come between the inner edges of the flanges 54, thereby holding the tray sides spread. The tray is held in place by a depending tongue 58 on the back of the plate 46, said tongue seating in a keeper notch 59 in the forward edge of the tray bottom 52.

In the rear portion of the feeding chamber is a screen partition 60 rising to such a height as to prevent scattering of feed etc., into the transverse chamber. The feeding chamber also contains a feed cup 61, and in the other chambers are mounted porches 62.

The top of the transverse cage section carries suitable means 63 for attachment to a suspension hook 64.

I claim:

1. A bird cage consisting of a longitudinal section and a transverse section intersecting the same and projecting from opposite sides thereof, said sections being intercommunicating, that portion of the longitudinal section which is ahead of the transverse section being a feeding chamber the side walls of which converge forwardly, and said chamber having a front opening, a closure for said opening, and a tray insertible into and removable from the chamber through the front opening, said tray having pivoted side walls adjustable to conform to the convergence of the chamber side walls.

2. A bird cage consisting of a longitudinal section and a transverse section intersecting the same and projecting from opposite sides thereof, said sections being intercommunicating, that portion of the longitudinal section which is ahead of the transverse section being a feeding chamber the side walls of which converge forwardly, and said chamber having a front opening, a closure for said opening, and a tray insertible into and removable from the chamber through the front opening, said tray having pivoted and reticulated side walls adjustable to conform to the convergence of the chamber side walls.

3. A bird cage consisting of a longitudinal section and a transverse section intersecting the same and projecting from opposite sides thereof, said sections being intercommunicating, that portion of the longitudinal section which is ahead of the transverse section being a feeding chamber having a front opening, a closure for said opening, a tray insertible into and removable from the chamber through said opening, and a locking tongue on the closure, the bottom of the tray having a keeper aperture for said tongue.

In testimony whereof I affix my signature.

JOHN STAKUTIS.